(12) United States Patent
Park

(10) Patent No.: US 8,075,021 B2
(45) Date of Patent: Dec. 13, 2011

(54) OIL COOLER MOUNTING UNIT FOR AUTOMATIC TRANSMISSION

(75) Inventor: Jae Woo Park, Ansan (KR)

(73) Assignees: Hyundai Motor Company, Seoul (KR); Halla Climate Control Corp., Seoul (KR)

( * ) Notice: Subject to any disclaimer, the term of this patent is extended or adjusted under 35 U.S.C. 154(b) by 282 days.

(21) Appl. No.: 12/143,135

(22) Filed: Jun. 20, 2008

(65) Prior Publication Data
US 2009/0151919 A1    Jun. 18, 2009

(30) Foreign Application Priority Data
Dec. 14, 2007  (KR) .................. 10-2007-0131545

(51) Int. Cl.
*F16L 39/00* (2006.01)
(52) U.S. Cl. ..................... 285/124.4; 285/208
(58) Field of Classification Search .............. 285/207, 285/193, 124.3, 124.4, 124.2, 208, 201, 191, 285/220, 219, 192, 205, 124.1, 347
See application file for complete search history.

(56) References Cited

U.S. PATENT DOCUMENTS

| | | | | |
|---|---|---|---|---|
| 2,305,668 A | * | 12/1942 | Bruno ........................... 285/331 |
| 5,727,304 A | * | 3/1998 | Eybergen ..................... 29/525.04 |
| 6,386,593 B1 | * | 5/2002 | Slais et al. ................... 285/205 |
| 6,676,167 B2 | * | 1/2004 | Schroeder et al. ............ 285/205 |
| 6,869,107 B2 | * | 3/2005 | Schroeder et al. ............ 285/205 |
| 6,893,052 B2 | * | 5/2005 | Wildermuth et al. ......... 285/205 |
| 6,896,298 B2 | * | 5/2005 | Walterscheid et al. ....... 285/205 |
| 6,908,117 B1 | * | 6/2005 | Pickett et al. ............ 285/137.11 |
| 6,969,094 B2 | * | 11/2005 | Frohling et al. .............. 285/205 |
| 7,237,807 B2 | * | 7/2007 | Hiyama et al. ............. 285/141.1 |
| 7,300,075 B2 | * | 11/2007 | Ebskamp et al. ............. 285/208 |
| 7,415,765 B2 | * | 8/2008 | Ozawa ..................... 29/890.149 |
| 7,540,539 B2 | * | 6/2009 | Fujiwara et al. .............. 285/205 |
| 7,621,568 B2 | * | 11/2009 | Schroeder et al. ............ 285/336 |
| 7,712,788 B2 | * | 5/2010 | Wildermuth et al. ...... 285/142.1 |
| 2003/0080554 A1 | * | 5/2003 | Schroeder et al. ......... 285/125.1 |

FOREIGN PATENT DOCUMENTS

KR       20-0309357 Y1    6/2003
KR       10-0536353 B1    12/2005

* cited by examiner

Primary Examiner — Aaron Dunwoody
(74) Attorney, Agent, or Firm — Morgan, Lewis & Bockius LLP

(57) ABSTRACT

A mounting unit connects a coolant pipe within a radiator tank to a coolant supply pipe or a coolant return pipe outside the radiator tank. The mounting unit includes an engaging structure on the coolant pipe and an engaging flange on the coolant supply pipe or the coolant return pipe. The engaging structure includes a boss, a flange, a connecting hole, and an engaging bolt. The boss is configured to be inserted through a mounting hole of the radiator tank. The engaging flange includes a recess configured for the engaging structure to be inserted therein, a bolt hole configured for the engaging bolt to be inserted therein, and a connecting nipple configured to fluidly communicate with the connecting hole.

8 Claims, 3 Drawing Sheets

OIL COOLER MOUNTING UNIT FOR AUTOMATIC TRANSMISSION

CROSS-REFERENCE TO RELATED APPLICATION

This application claims priority to, and the benefit of, Korean Patent Application No. 10-2007-0131545, filed in the Korean Intellectual Property Office on Dec. 14, 2007, the entire contents of which are incorporated herein by reference.

BACKGROUND OF THE INVENTION (a) Field of the Invention

The present invention relates to an oil cooler mounting unit for an automatic transmission.

(b) Description of the Related Art

A heat exchanger, called an oil cooler, is typically used to cool engine oil or transmission fluid in a vehicle. In an oil cooler for an automatic transmission, transmission fluid, also called oil herein for simplicity, is cooled in a radiator core.

In a down-flow radiator, as opposed to a cross-flow radiator, a coolant pipe is disposed within a lower tank of the radiator, and is connected to a coolant supply pipe and/or coolant return pipe by an oil cooler mounting unit.

A conventional oil cooler mounting unit includes a connecting pipe attached perpendicularly to an end of the coolant pipe. The connecting pipe has a screw thread on its external surface. The connecting pipe is inserted through a mounting hole of the lower tank and attached with a nut. The coolant supply pipe or coolant return pipe is engaged with an end of the connecting pipe with an additional nut.

The screw thread of the connecting pipe may be easily damaged by corrosion. To solve this, the connecting pipe is sometimes made of brass instead of aluminum, but brass is costly. Also, air-tightness between the connecting pipe and the supply or return pipe is not reliable.

The above information disclosed in this Background section is only for enhancement of understanding of the background of the invention and therefore it may contain information that does not form the prior art that is already known in this country to a person of ordinary skill in the art.

SUMMARY OF THE INVENTION

A mounting unit connects a coolant pipe within a radiator tank to a coolant supply pipe or a coolant return pipe outside the radiator tank. The mounting unit includes an engaging structure on the coolant pipe and an engaging flange on the coolant supply pipe or the coolant return pipe. The engaging structure includes a boss, a flange, a connecting hole, and an engaging bolt. The boss is configured to be inserted through a mounting hole of the radiator tank. The engaging flange includes a recess configured for the engaging structure to be inserted therein, a bolt hole configured for the engaging bolt to be inserted therein, and a connecting nipple configured to fluidly communicate with the connecting hole.

The engaging structure and the engaging flange may be oval-shaped. A first O-ring may be provided between the flange and the mounting hole of the radiator tank. The engaging bolt may be a stud bolt. A second O-ring may be provided between the connecting hole of the engaging structure and the connecting nipple of the engaging flange. The engaging flange may also include a connecting passage fluidly connecting the connecting nipple to the coolant supply pipe or coolant return pipe. The engaging flange may be partially inserted into the mounting hole, and a part of the engaging flange may protrude outside of the radiator tank.

DETAILED DESCRIPTION OF PREFERRED EMBODIMENTS

An exemplary embodiment of the present invention will hereinafter be described in detail with reference to the accompanying drawings.

Figure 1:
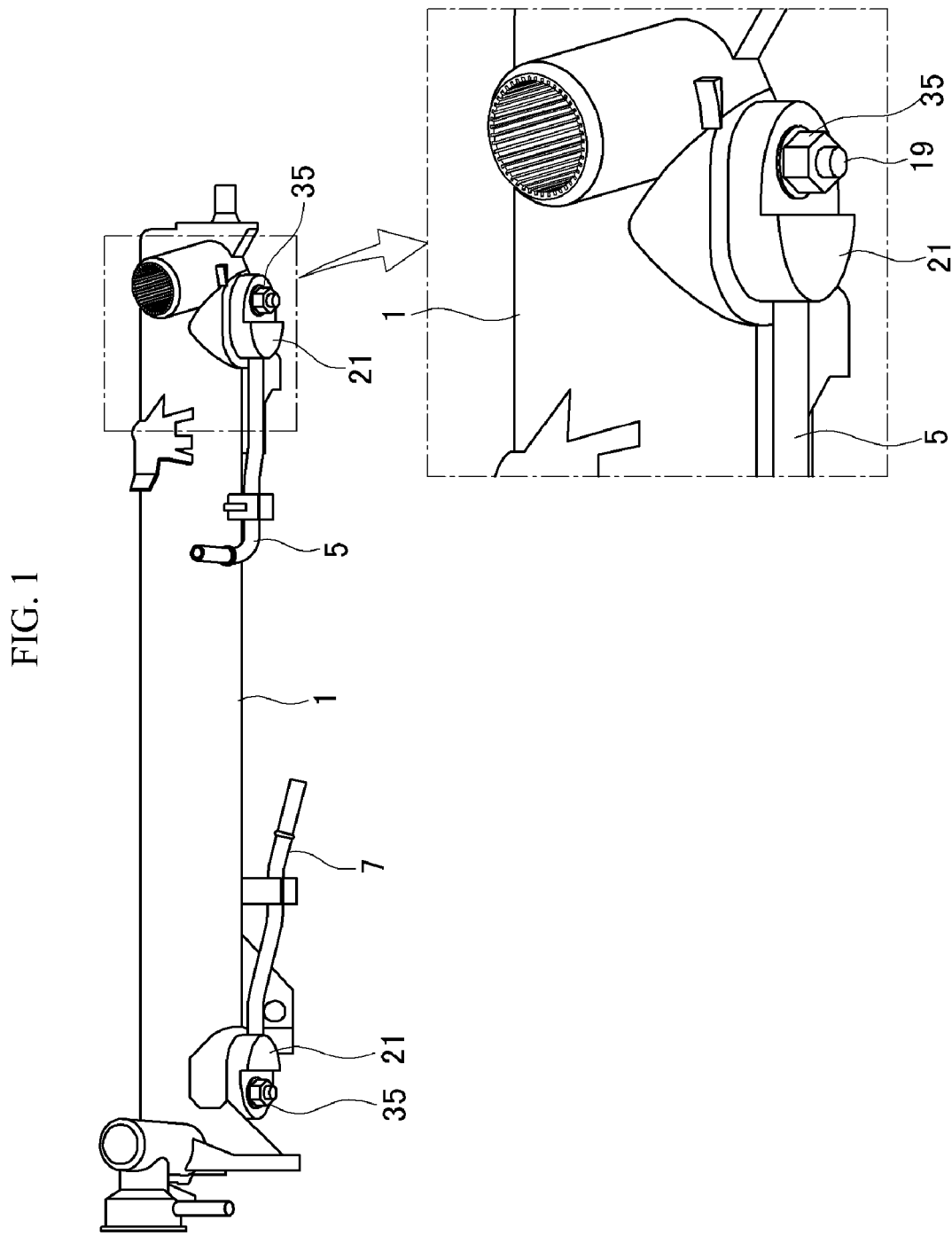
FIG. 1 is a perspective view of an oil cooler mounting unit for an automatic transmission according to an exemplary embodiment of the present invention.
Figure 2:
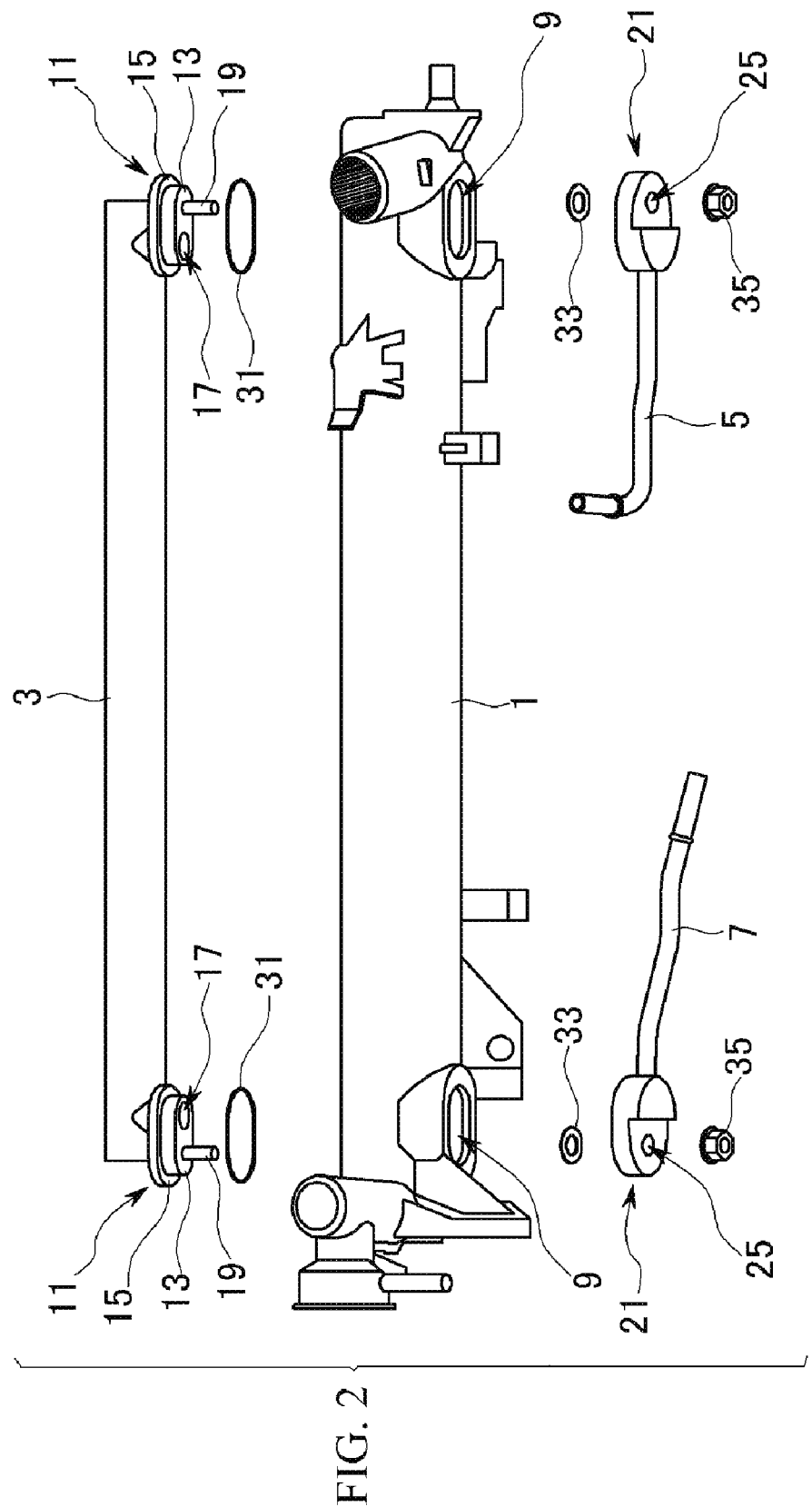
FIG. 2 is an exploded perspective view of the oil cooler mounting unit of FIG. 1.
Figure 3:
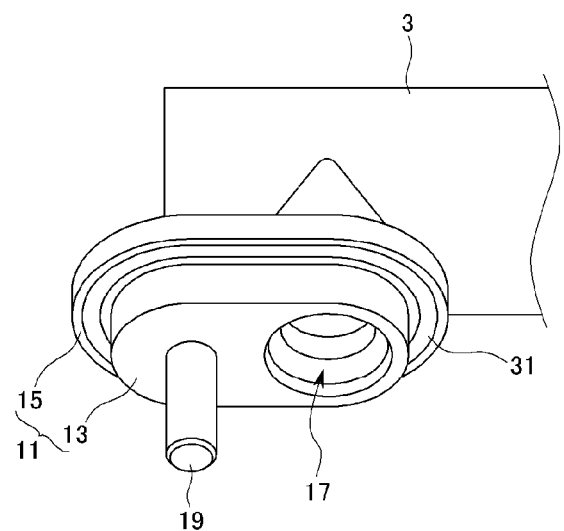
FIG. 3 is a perspective view of an engaging structure of the oil cooler mounting unit of FIGS. 1 and 2.

As shown in FIG. 1 and FIG. 2, an oil cooler mounting unit for an automatic transmission according to an exemplary embodiment of the present invention includes a coolant pipe 3 disposed within a radiator tank 1. A coolant supply pipe 5 and a coolant return pipe 7 are disposed outside of the radiator tank 1 and connected to the coolant pipe 3.

An engaging structure 11 on the coolant pipe 3 includes a boss 13 that is inserted into a mounting hole 9 of the radiator tank 1, and a flange 15 that rests above the mounting hole 9 with a first O-ring 31 disposed between the flange 15 and the mounting hole 9.

The boss 13 includes a connecting hole 17 connected with the coolant pipe 3, and an engaging bolt 19, such as a stud bolt.

Figure 4:
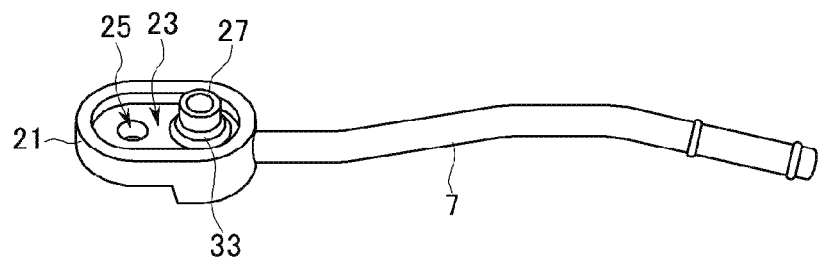
FIG. 4 is a perspective view of an engaging flange of the oil cooler mounting unit of FIGS. 1 and 2.

An engaging flange 21 is connected with the coolant return pipe 7 and/or the coolant supply pipe 5, as shown in FIG. 2 and FIG. 4. An oval recess 23 is provided on the engaging flange 21, for the boss 13 to be seated therein. A bolt hole 25 for the engaging bolt 19 to be inserted therein, and a connecting nipple 27 that is inserted into the connecting hole 17, are provided in the recess 23.

Figure 5:
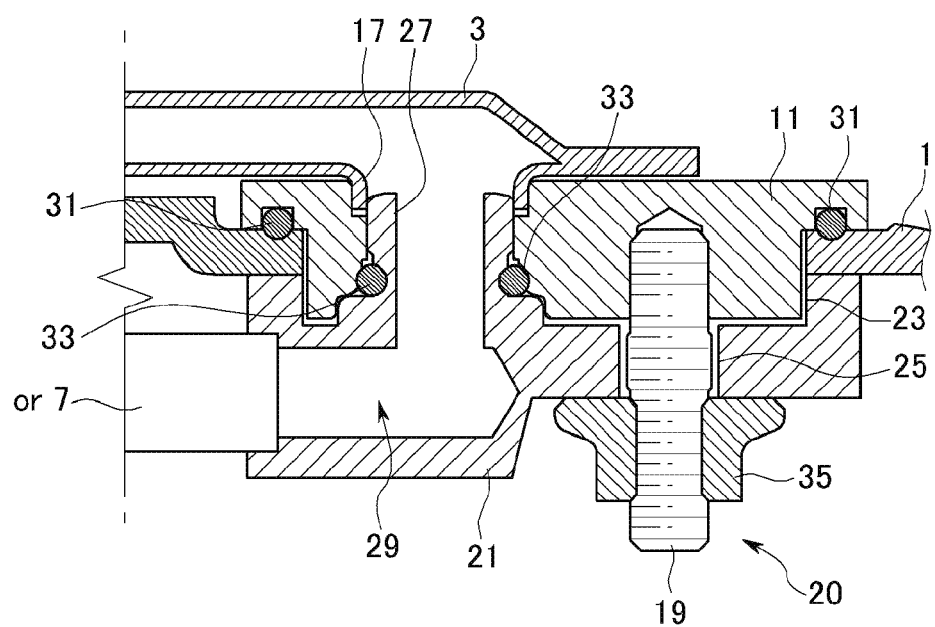
FIG. 5 is a cross-sectional view of the oil cooler mounting unit of FIGS. 1 and 2.

As shown in FIG. 5, inside of the engaging flange 21, a connecting passage 29 fluidly connects the connecting nipple 27 to the coolant supply pipe 5 or the coolant return pipe 7.

A second O-ring 33 is disposed between the connecting hole 17 and the connecting nipple 27.

The engaging flange 21 is partially inserted into the mounting hole 9, while a part of the engaging flange 21 protrudes outside of the radiator tank 1.

The boss 13 is fixed to the recess 23. The engaging bolt 19 is inserted into the bolt hole 25, and the connecting nipple 27 is inserted into the connecting hole 17. A nut 35 is fixed to the engaging bolt 19 so that the engaging structure 11 and the engaging flange 21 are assembled.

According to an exemplary embodiment of the present invention, the coolant passage (connecting hole 17 and connecting nipple 27) and an engaging portion 20 (FIG. 5, engaging bolt 19 and nut 35) are fluidly separated from each other, preventing corrosion of the engaging portion 20.

The oil cooler mounting unit may be made of aluminum, minimizing manufacturing cost. The second O-ring 33 provides reliable air-tightness.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. A mounting unit for an automatic transmission comprising:
   a radiator tank with a mounting hole;
   a coolant supply pipe or a coolant return pipe outside the radiator tank;
   a coolant pipe within the radiator tank connected with the coolant supply pipe or the coolant return pipe;
   an engaging structure on the coolant pipe, comprising a boss, a flange, a connecting hole formed in the boss, and an engaging bolt formed in the boss, the boss being configured to be inserted through the mounting hole of the radiator tank; and
   an engaging flange on the coolant supply pipe or the coolant return pipe, comprising a recess configured for the boss of the engaging structure to be inserted therein, a bolt hole formed in the recess and configured for the engaging bolt to be inserted therein, and a connecting nipple formed in the recess and detachably connected to the connecting hole of the engaging structure and configured to fluidly communicate with the connecting hole.

2. The unit of claim 1, wherein the engaging structure and the engaging flange are substantially oval-shaped.

3. The unit of claim 1, further comprising an O-ring disposed between the flange and the mounting hole of the radiator tank.

4. The unit of claim 1, wherein the engaging bolt comprises a stud bolt.

5. The unit of claim 1, further comprising an O-ring disposed between the connecting hole of the engaging structure and the connecting nipple of the engaging flange.

6. The unit of claim 1, wherein the engaging flange further comprises a connecting passage fluidly connecting the connecting nipple to the coolant supply pipe or coolant return pipe.

7. The unit of claim 1, wherein the engaging flange is partially inserted into the mounting hole and a part of the engaging flange protrudes outside of the radiator tank.

8. The unit of claim 1, wherein the flange of the engaging structure and the engaging flange are disposed with a predetermined gap to receive a portion of the radiator tank.

* * * * *